United States Patent
Errard et al.

(10) Patent No.: US 8,764,300 B2
(45) Date of Patent: Jul. 1, 2014

(54) BEARING WITH THREE ROWS AND MORE MOBILE BODIES

(75) Inventors: Germain Errard, Pornic (FR); Eric Jacquemont, Clisson (FR); Jean-Michel Delacou, Mortagne sur Sevre (FR)

(73) Assignee: Defontaine, Le Bruffiere (FR)

( * ) Notice: Subject to any disclaimer, the term of this patent is extended or adjusted under 35 U.S.C. 154(b) by 29 days.

(21) Appl. No.: 13/425,653

(22) Filed: Mar. 21, 2012

(65) Prior Publication Data
US 2012/0243819 A1 Sep. 27, 2012

(30) Foreign Application Priority Data
Mar. 25, 2011 (FR) .................................. 11 52517

(51) Int. Cl.
| F16C 19/49 | (2006.01) |
| F16C 19/34 | (2006.01) |
| F16C 19/14 | (2006.01) |
| F16C 19/32 | (2006.01) |
| F16C 19/12 | (2006.01) |
| F16C 19/54 | (2006.01) |
| F16C 19/38 | (2006.01) |

(52) U.S. Cl.
CPC .............. F16C 19/545 (2013.01); F16C 19/381 (2013.01)
USPC ........... 384/452; 384/455; 384/589; 384/608; 384/619; 416/248

(58) Field of Classification Search
USPC ......... 384/452–453, 504, 547–548, 604, 608, 384/613, 618–619; 416/61, 131, 147, 204
See application file for complete search history.

(56) References Cited

U.S. PATENT DOCUMENTS

| 2,499,837 | A | * | 3/1950 | Sheets et al. ................. 384/512 |
| 3,748,002 | A | * | 7/1973 | Barker et al. ................ 384/453 |
| 3,762,782 | A | | 10/1973 | Rumbarger |
| 4,906,113 | A | * | 3/1990 | Sague ........................... 384/618 |
| 4,989,999 | A | * | 2/1991 | Siemensmeyer ............. 384/455 |
| 5,074,677 | A | * | 12/1991 | Andree et al. ................ 384/448 |
| 6,543,938 | B2 | * | 4/2003 | Dittenhofer .................. 384/455 |
| 8,047,792 | B2 | * | 11/2011 | Bech et al. ................... 416/239 |
| 2008/0199315 | A1 | * | 8/2008 | Bech ............................ 416/61 |
| 2009/0175724 | A1 | * | 7/2009 | Russ et al. .................... 416/131 |
| 2009/0257697 | A1 | * | 10/2009 | Andersen .................... 384/455 |
| 2009/0285693 | A1 | * | 11/2009 | Bech ............................ 416/248 |

FOREIGN PATENT DOCUMENTS

| DE | 1976014 U | 12/1967 |
| DE | 102007052383 A1 | 5/2008 |
| DE | 102007015421 A1 | 10/2008 |
| EP | 0234469 A2 | 9/1987 |

* cited by examiner

*Primary Examiner* — Marcus Charles
(74) *Attorney, Agent, or Firm* — Bachman & LaPointe, P.C.

(57) ABSTRACT

A wind turbine rotor hub bearing where the series of mobile members include more than two annular series of such members whereof at least two have different median diameters which are arranged in more than two rows scaled along the bearing rotational axis, with two end rows each comprising a series of roller bearings having individually a rotational axis transversal to the axis and at least an intermediary row of mobile members comprising balls.

12 Claims, 10 Drawing Sheets

FIG_8

BEARING WITH THREE ROWS AND MORE MOBILE BODIES

BACKGROUND

The invention relates to a pivoting bearing or a slewing ring, on installations where the subjected forces are significant.

The wind turbine field is particularly concerned.

In fact, proposing such a bearing for a blade of a wind turbine rotor hub is a purpose in itself.

Generally, there are already bearings liable to be subjected to extensive forces, the related bearing being interposed and fixed between a first structure and a second structure between which forces pass, via the bearing, at least one of these structures being able to turn with respect to the other, around the bearing rotational axis.

The bearing comprises:
 a first and a second bearing race, a portion of the second bearing race extending around the first radially to said rotational axis,
 and several sets of mobile members (or bodies), each interposed between the first and a second bearing races, annularly around said axis.

On certain installations, the subjected forces may be very high both axially (rotational axis) and radially to this axis. The moments are also sometimes very important.

In the field of wind turbines, wind turbine blades are not only subjected to important forces in the axis of the/each blade (axial forces) but also to very important forces exerted radially to the blade axis and the rotor hub (forces thus called radial).

In this case, the aforementioned first and second structures may in particular be respectively a wind turbine rotor hub and a wind turbine blade, the blade being thus able to turn with respect to the hub around said bearing rotational axis.

The rotational speeds, the ever-increasing dimensions of wind turbines, the forces imposed by the wind, but also the forces pertaining to the pitch angle of the blades impose an ever-heightened resistance of the bearings.

In this respect, it is common that the bearings are able to pivot some ten degrees around their axis of elongation to promote the yield according to the strength of the wind.

SUMMARY OF THE INVENTION

It is in this general context that a purpose of the invention is to improve the mechanical resistance of the bearings. A corollary of this is to prevent certain issues related to the use of slewing rings for wind turbine blades particularly the wear due to the vibrations (False Brinelling).

A proposed solution consists in that said several series of mobile members comprise at least three annular series whereof at least two are located, with respect to said bearing rotational axis, on different radiuses and which are arranged in at least three rows scaled along this rotational axis.

Very favorably, said at least three rows of mobile members scaled along said bearing rotational axis will comprise, between two end rows, at least an intermediary row of mobile members capable of being in movement along the tracks of the first and second bearing races, according to point contacts.

Thus, an enhanced resistance to the efforts perpendicular to the bearing rotational axis will be ensured.

Thanks to an/such intermediary row(s), an efficient resistance to these radial efforts will be ensured although it will be weaker than for example with roller bearings, while allowing for a vibration resistance for the pivotings, thus cancelling the wear by false brinelling particularly in the field of wind turbines.

A solution with intermediary row(s) of mobile members comprising ball bearings or spherical ball bearings has been particularly efficient, particularly in terms of stiffness and limitation of radial race movement, thus limiting false brinelling.

Also favorably, the mobile members of the intermediary row(s) belonging to the three rows, or more, of mobile members scaled along the bearing rotational axis are preloaded in a plane that is perpendicular to this rotational axis.

Particularly for the resistance at the increasingly important overturning moments, it is considered that the mobile members of the end rows of said at least three rows of mobile members may be barrel bearings or roller bearings and more generally lineic contact mobile members, having in both cases individually a rotational axis transversal to the bearing rotational axis.

Here, "transversal" generally indicates that the considered rotational axis crosses the bearing rotational axis, not necessarily perpendicularly.

Particularly a roller bearing solution in the form of cylinders of constant section and/or with individual rotational axis perpendicular to the bearing rotational axis, will make it possible to ensure an efficient performance in parallel with the bearing rotational axis, hence, the absorption of forces thus directed, as well as the overturning moments (in particular on wind turbines), with an expected increase in the load capacity.

Moreover, by arranging the mobile members of the intermediary row(s) on a same (median) diameter different from those of the two end rows, which, will thus also be favorably on a joint (median) diameter, the vibration resistance and the mechanical resistance of the assembly will be particularly favored, in dynamic.

This and the forgoing being specifically relevant in the wind turbine field, it is legitimate that also concerned are a wind turbine comprising a rotor hub, at least a blade and a bearing or slewing ring, as presented above, the blade being able to turn with respect to the hub and the mobile members thus arranged being adapted to maintain together the forces and specific moments of this field, and most particularly the vibrations, thus limiting, even stopping, the wear by false brinelling.

The above characteristics, even those which follow in relation with the more detailed description hereinafter, favor the reliability of the related installations with pivoting bearings or slewing rings, as well as the assembly/disassembly ergonomics, by offering a technically and financially high-performing solution.

BRIEF DESCRIPTION OF THE DRAWINGS

In the examples illustrated in the accompanying drawings.

DETAILED DESCRIPTION OF THE PREFERRED EMBODIMENT(S)

Figure 1:
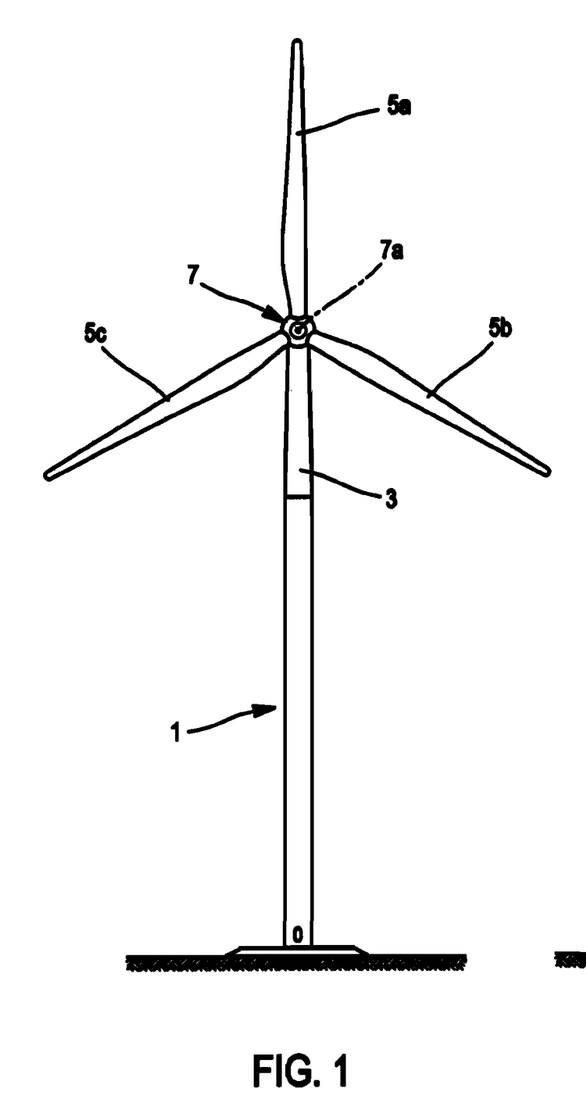
FIG. 1 is a front diagram of a wind turbine in accordance with the solution presented here.
Figure 2:
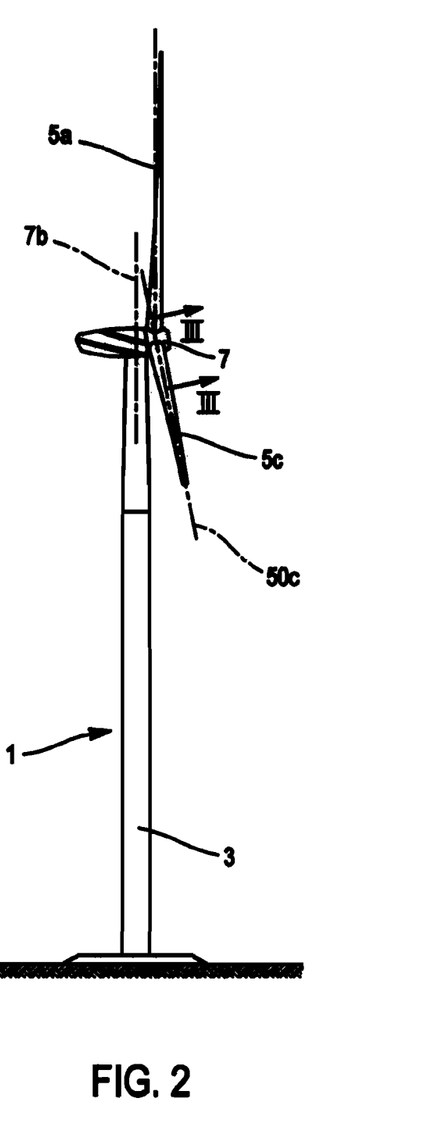
FIG. 2 is a side view,
 FIGS. 3 and 4 each show a possible embodiment at the III-III section of FIG. 2.

FIGS. 1 and 2, a wind turbine 1 can be seen comprising a tower 3 topped with at least a blade, here three, 5a, 5b, 5c, turn around the horizontal axis 7a of a central hub 7.

Typically, the hub 7 is itself mounted turning around a vertical axis 7b with respect to the tower 3, in order to be better oriented with respect to the wind.

Each blade, and in particular blade 5c of FIG. 2 may pivot by a few degrees or by about ten degrees around its axis of elongation 50c, with respect to the rotor hub 7, such as to regulate the turbine power and speed of rotation.

Figure 3:
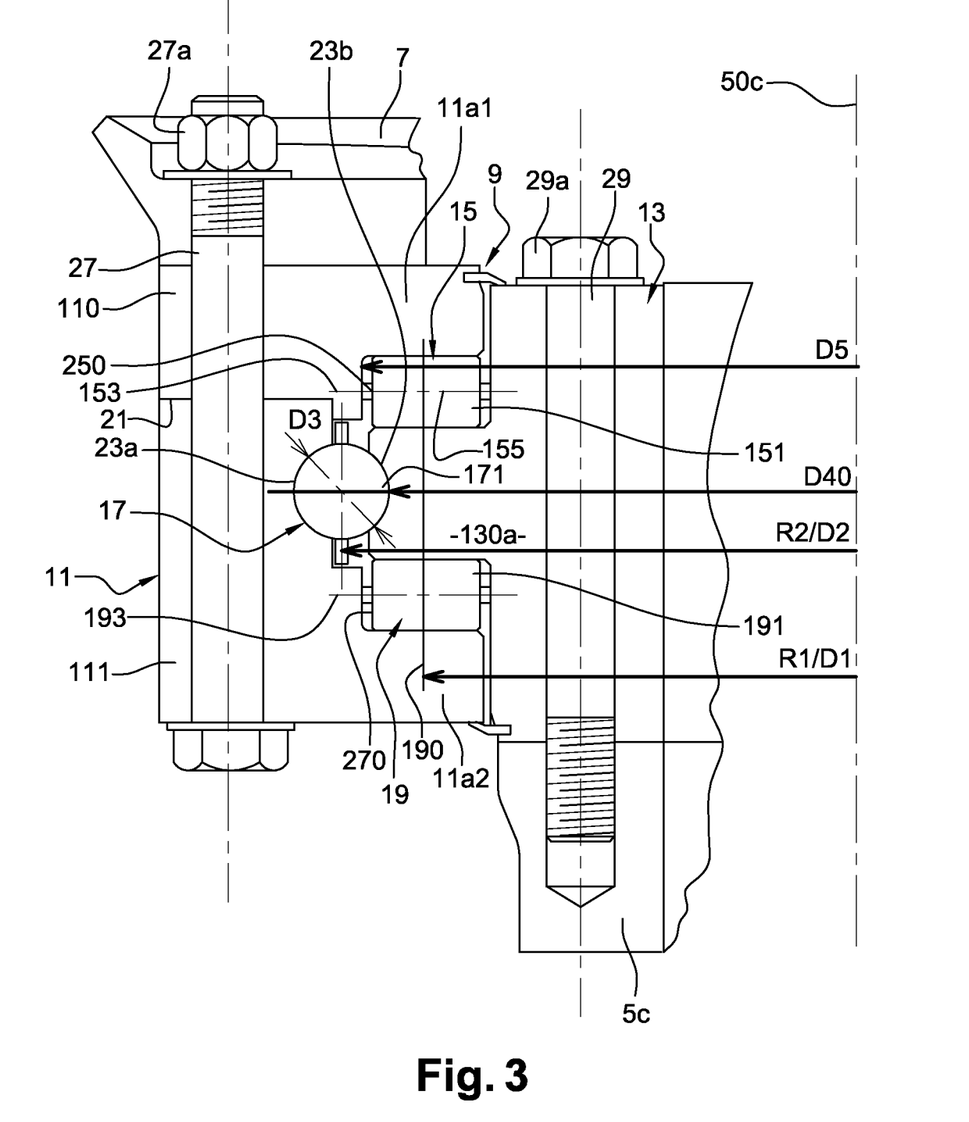
Figure 4:
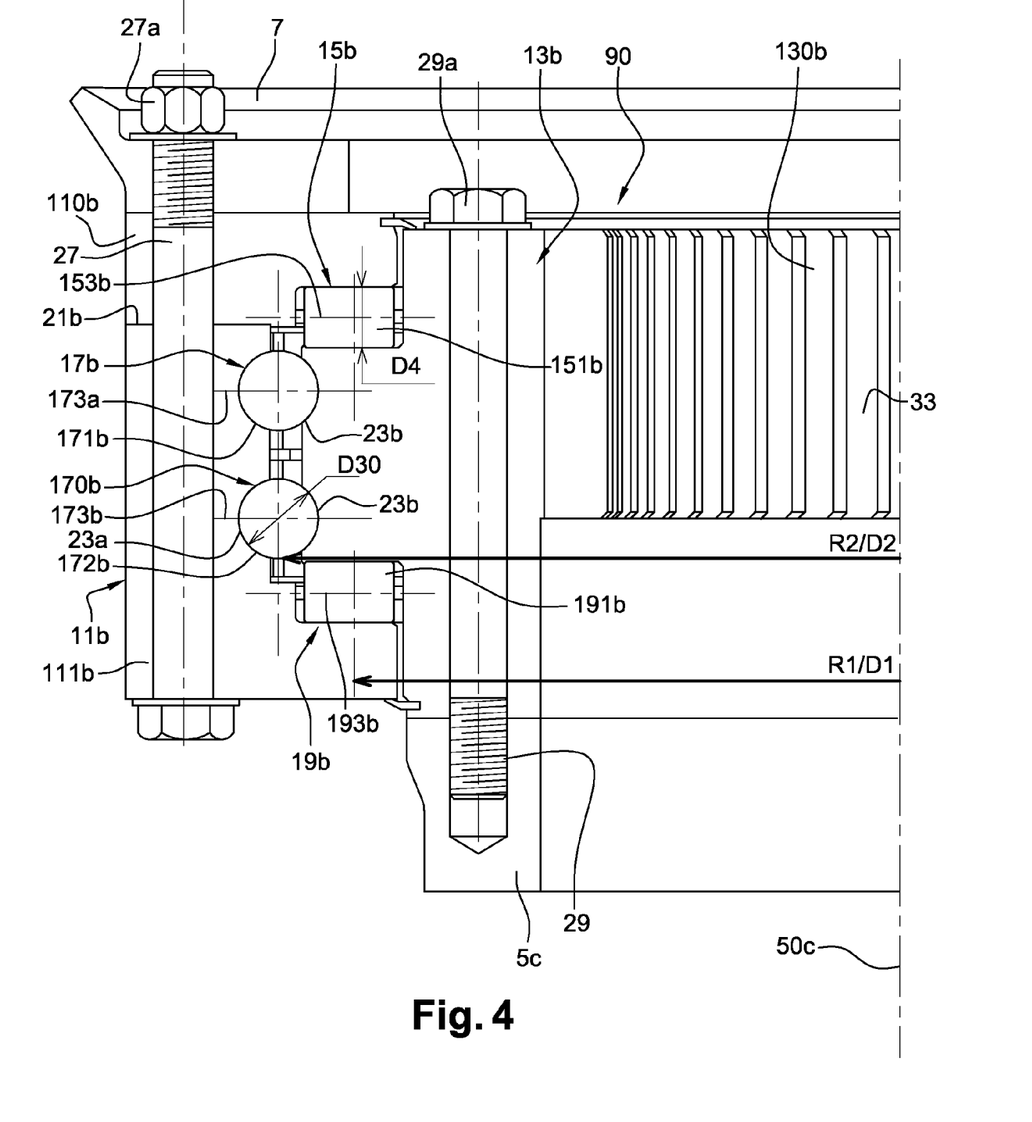

In FIGS. 3 and 4, at 7 can be found the rotor hub and in 50c the blade axis 5c (50c also locating the bearings rotational axis, respectively 9, 90, illustrated).

The privileged angular orientation of each blade, such as blade 5c, particularly generates important radial forces, as well as high bending moments.

The illustrated bearings, or slewing rings, 9, 90 respectively comprise a first bearing race 11, 11b, a second bearing race 13, 13b and several series of mobile members 15, 15b, 17, 17b, 170b, 19, 19b (cf. FIG. 3, 4).

The end portions 11a1, 11a2 of the first bearing race which extend around portions facing the second race, radially to the rotational axis 50c, serve, with the central nose 130a of the latter, to maintain the mobile members of the end rows such as 15, 19; 15b, 19b . . . .

Figure 5:
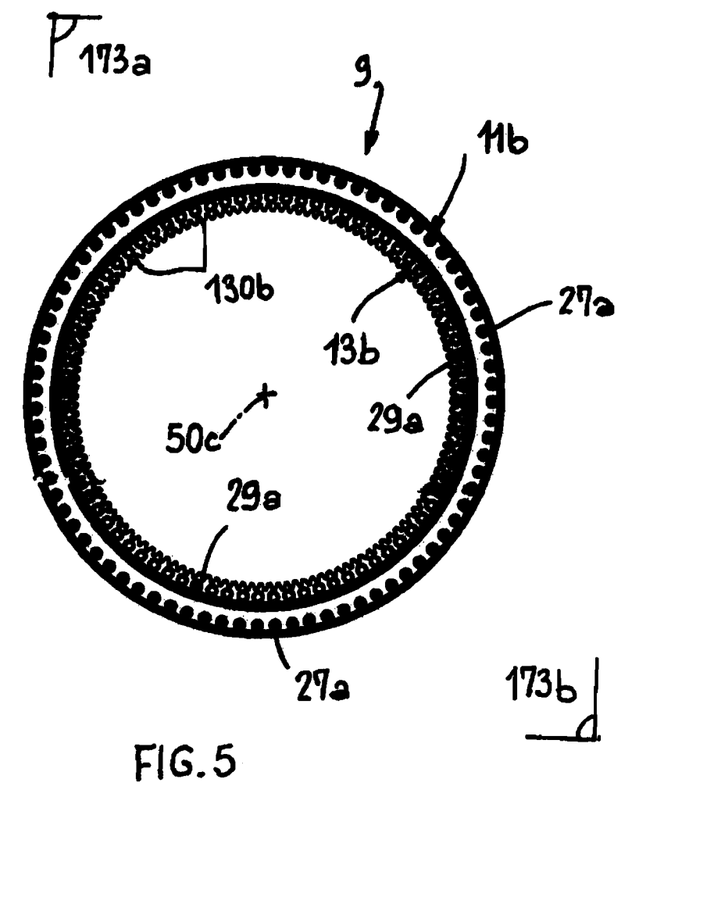
FIG. 5 is a front view of the concerned slewing ring, here that of FIG. 4 (one should imagine the other embodiments in the same manner)

Traditionally, each series of mobile members is arranged in a circle, as shown in FIG. 5, thus between the first and second bearing races, annularly around axis 50c.

In the illustrated examples, FIG. 3, 4, these series of mobile members respectively comprise three and four annular series which are respectively placed in three and four scaled rows along said axis 50c.

These rows of mobile members comprise:
- two (axial) end rows 151, 191; 151b, 191b, each comprising a series of roller bearings 15, 19; 15b, 19b having individually a rotational axis 153, 193; 153b, 193b, transversal to (which obliquely crosses) the bearing rotational axis 50c,
- and respectively one (FIG. 3) and two (FIG. 4) (axially) intermediary rows 171; 171b, 172b of mobile members comprising balls: 17, 17b, 170b.

Thus, there is axial spacing over three or four levels or rows. In other words: the series of mobile members comprise more than two annular series (thus two rows) of such members, scaled along axis 50c.

FIGS. 3, 4 the end rows and the intermediary row(s) of these series of mobile members have different median diameters. Here, the end rows are on a same median diameter D1 (measured between the axis 50c and the middle of roller bearings 15, 19; 15b, 19b), likewise for the intermediary row(s): median diameter D2 measured in the same manner (balls). FIGS. 3, 4 radiuses (R1, R2) are illustrated. Thus, these mobile members, on the one side of the end rows and, on the other side of the intermediary rows, are located, with respect to said rotational axis 50c, on different radiuses, respectively R1, R2.

In a more generic manner, one thus finds in the presented solution one or two annular series of mobile members 17, 17b, 170b adapted to withstand at least forces oriented radially or transversally to the bearing rotational axis 50c, this/these series being interposed, in projection along this axis, between the (series of) mobile members of the two end rows each adapted to substantially withstand forces oriented in parallel or substantially in parallel to the bearing rotational axis.

Figure 6:
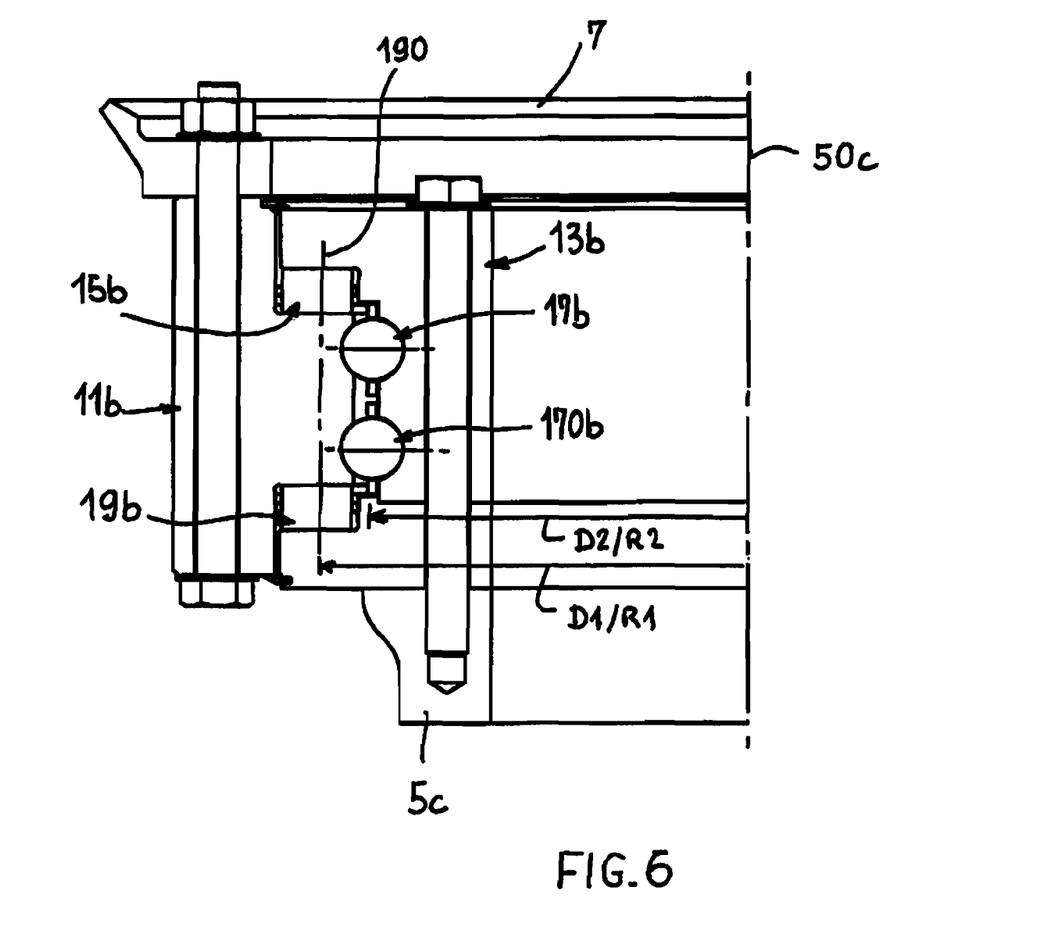
FIG. 6 shows end roller bearings and intermediary balls.

FIGS. 3, 4 but also FIG. 6, the roller bearings 15, 19; 15b, 19b are cylinders of substantially constant section.

The radius varies very slightly along the roller bearing in order to obtain a distribution of constant pressure, a taper at each end makes it possible to reduce the edge effects. In addition, the individual rotational axis of the roller bearings (such as 155 on FIG. 3 for that shown in 15) is perpendicular to the bearing rotational axis 50b.

FIGS. 3, 4, the mobile members of the intermediary row(s) 171; 171b, 172b are all identical and located in a same median diameter centered on the axis 50c (median diameter D2).

As for the corresponding balls 17, 17b, 170b, if there are several series, it is recommended that they all have the same diameter, such as D30 on FIG. 4, the roller bearings of the two end rows being also preferably all identical: diameter marked as D4 on FIG. 4, this particularly for wind turbine blade bearing applications. In other applications for which an axial force will be paramount in a privileged direction, the diameter D30 of the mobile bodies (or members) 17b, 170b of the intermediary row(s) may be less than D4.

FIG. 3, the intermediary mobile members, to which belongs the one 171 represented, are located, in the direction parallel to the axis 50c whereon each is located, substantially half-way between those of the two end rows. The intermediary row 171 being unique on FIG. 3, the diameter D3 of the balls is thereto higher than that of the shared D30 of the balls of the two intermediary successive rows of FIG. 4, but this may vary: the diameter of the ball is the result of a calculation based on the radial forces of the application.

FIG. 4, the balls of the intermediary rows higher 171b and lower 172b are respectively located, once again, in a direction parallel to the axis 50c whereon each is located, nearer to the roller bearings respectively from the higher end row 151b and the lower end row 191b than their homologous balls of the other intermediary row.

Once more on FIG. 4, and preferably the same thing on FIG. 3, respectively marked 173a and 173b, are the two median planes of the mobile members of the two illustrated intermediary rows. As recommended, these mobile members with point contact are preloaded respectively in every one of these planes, which are each perpendicular to the rotational axis 50c. For this, the diameter of the balls is, in the aforementioned plane, slightly higher than the difference of the radiuses measured from 50c of the rolling tracks (respectively 23a, 23b) of the races 11b and 13b which house them. Under stress, the load of these balls will thus be radial to the axis 50c. This radial load and possibly pre-load orientation will be, in fact, the same for the series of balls 17, on FIG. 3, or even for the balls of the intermediary row(s) of FIG. 6 and the following ones. Furthermore, on FIG. 3, 190 has been marked as the joint loading axis of the mobile members of the two end rows. It corresponds to an axial load. Thus, it is parallel to the axis 50c. This axis is either marked or not but illustrated on FIG. 4, then 6 and the next ones where there is therefore also an axis of axial load of the mobile members of the two end rows.

On FIG. 3 as well as on FIG. 4, it is also worth noting that one of the races is in several portions. It is the first bearing race 11, 11b that is radially higher with respect to the other race, substantially nearer to the rotational axis 50c.

Thus, in order to facilitate the assemblies/disassemblies and the maintenance, the first bearing race 11, 11b is in two portions, respectively 110, 111; 110b, 111b. The preferable mating surface, respectively 21, 21b, is for the transmission of forces, a plane near to the lower end row, here 19 or 19b, in order to establish a monoblock link between the rotor means and the balls of intermediary rows. On the illustration, the mating surface is substantially at the higher end row 151 or 151b which it surrounds in order to locally serve as a higher rolling path to the roller bearings of the higher end row, regarding the higher portion 110; 110b of this first race. Lower down, the additional lower portion, 111; 111b of this same race, serves as external rolling path to the balls of the (FIG. 3)/(FIG. 4) intermediary row(s), as well as lower rolling path to the roller bearings of the lower end row. A comparable assembly exists on the embodiments of the following figs.

It may be noted that, radially, for the resistance to force and moments, the diameter D40 of the bottom (at mid-height) of the internal rolling path 23 (also called track) of each ball is less than the diameter D5 of the external stop, transversal (here perpendicular) to the axis 50c, of each roller bearing, whether it be from the higher row (250) or the lower row (270). Thus, the track of the balls may be radially positioned on a diameter that is as close as possible to the diameter D1 of the row of roller bearings in order to limit the length of the central nose 130a and consequently, the bending constraints at its foot. The nose 130a is the central portion of the internal race 13 which extends radially to the internal rolling path 23. On either side, it also serves as central rolling path, for example to the roller bearings 15, 19.

In any case, all or part of the preceding characteristics will be implemented so that the mobile members thus arranged be adapted to withstand together oriented forces with radial and axial components with respect to the bearing rotational axis 50c.

Regarding the assembly on the hub 7 and the blade 5c, it will be further noted that, on either side of the bearings, the races 11, 13 are respectively fixed to the hub and to the blade.

The screws, with or without a head (studs), respectively 27 and 29, ensure the aforementioned fixations, parallel to the axis 50c, at two different radial distances from this axis. FIG. 5 shows this, with respectively outer 11b and inner 13b races (with its teeth 130b in inner periphery; of course predictable in the case of FIG. 3.)

The threaded rod of each fixing means 27 scaled on the periphery of the race 11 cooperates with a nut 27a. Each fixing means 29 is directly screwed onto the body of the blade root 5c, with its head 29a located hub side. Thus, the bolts 27, 29 are accessible from the hollow inside of the rotor hub 7.

The difference between the embodiments of FIGS. 4 and 6 is that the mobile members of the intermediary rows are radially located, in a further away case, in a less further away case, from the axis 50c (D2/R2) than the mobile members of the end rows.

This arrangement on one side or the other is however not determining for any of the embodiments covered by the here patentable solution.

The solutions with (axial) end rows with roller bearings should be able to make it possible to obtain a large axial load capacity but especially of overturning moment, preponderant load, particularly on the very large wind turbines (multi mega Watts). The limitation (by the pre-load) of the permitted radial movement of the mobile race is also noticeable.

Figure 7:
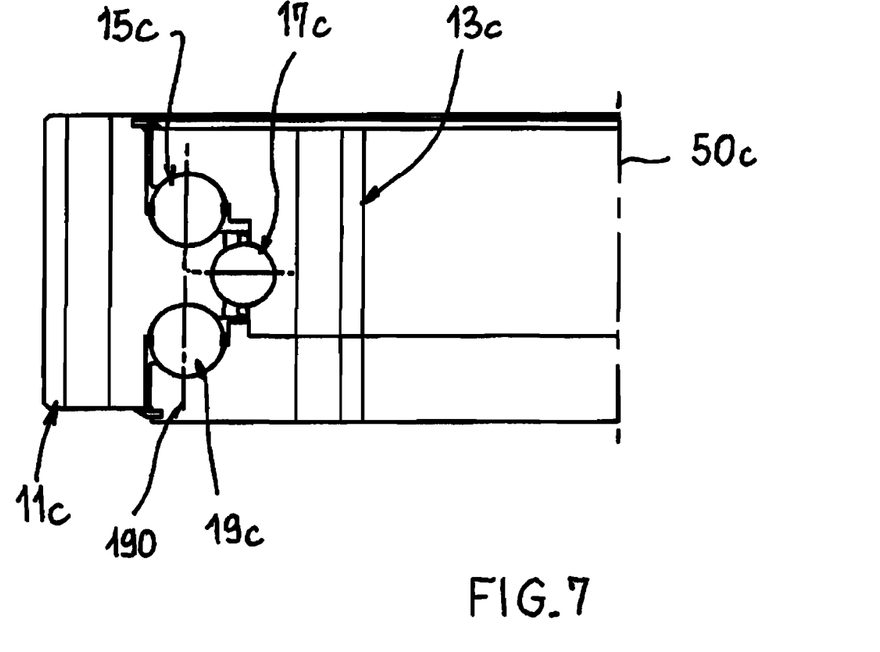
FIG. 7 shows balls in end and intermediary rows (only the bearing without the structures fixed to it is shown)

FIG. 7 makes it possible to show that structures other than a rotor hub and a wind turbine blade may be fixed to the turning races of the bearing. The realization of a depot crane turret is thus for example concerned, thus linked to any one of the described embodiments.

Figure 8:
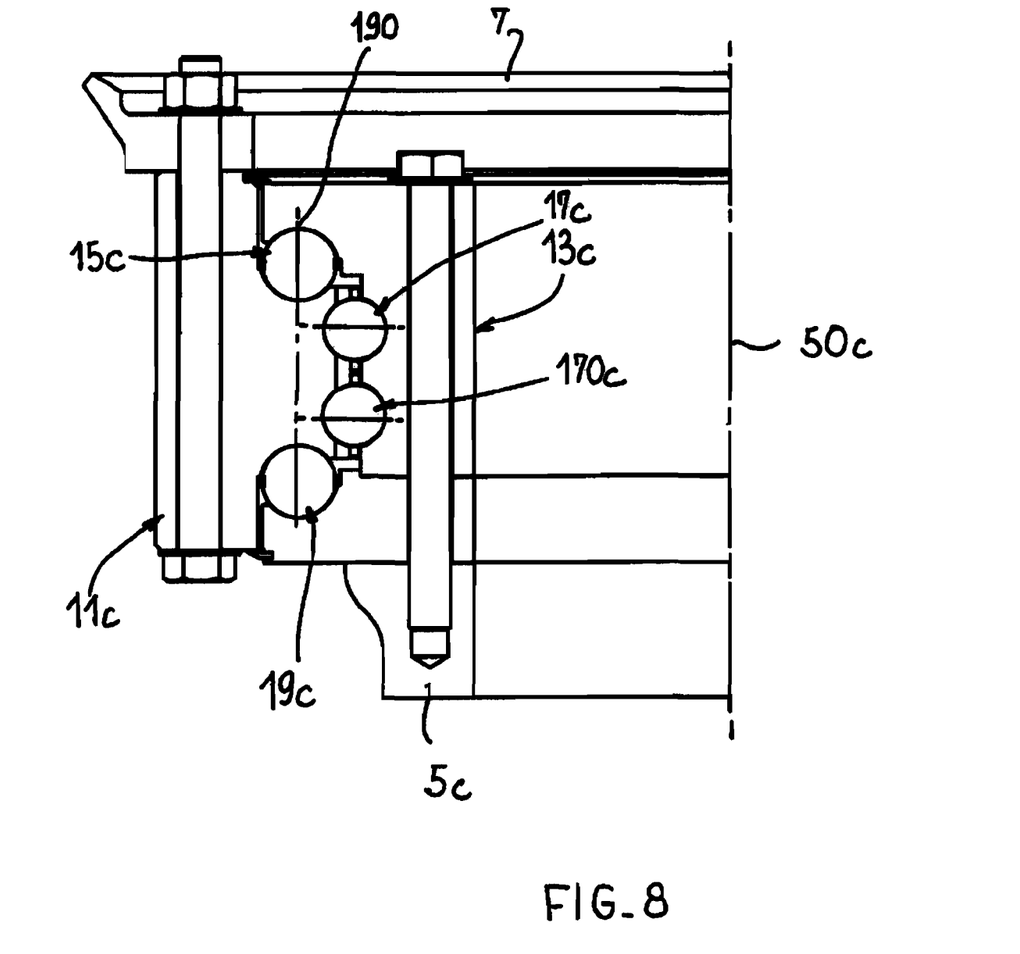
FIG. 8 shows balls in end rows and over two intermediary rows, and FIG. 9, 10, 11 show barrel bearings in end rows and balls over one or two intermediary rows.

FIGS. 7, 8, the mobile members 15c, 19c of the (axial) end rows are balls. They are (substantially) spherical. Likewise for the mobile members, respectively 17c and 17c, 170c, of the (axially) intermediary row(s). The axes for loading the mobile members are represented, as they are on the following figures.

Figure 9:
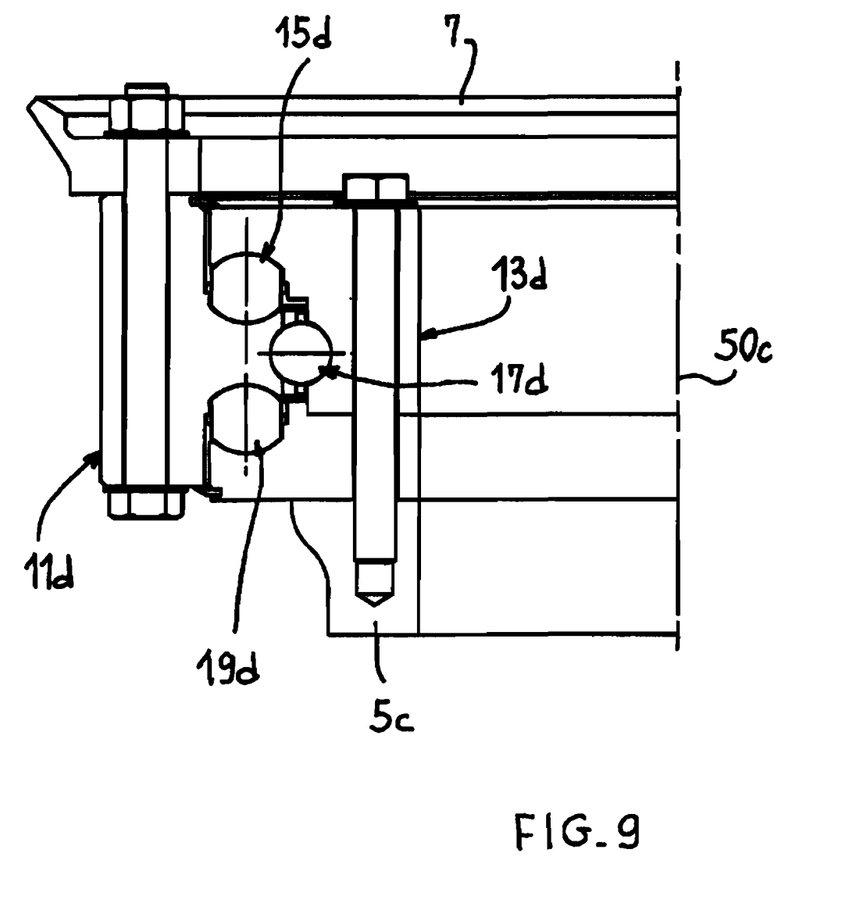
Figure 10:
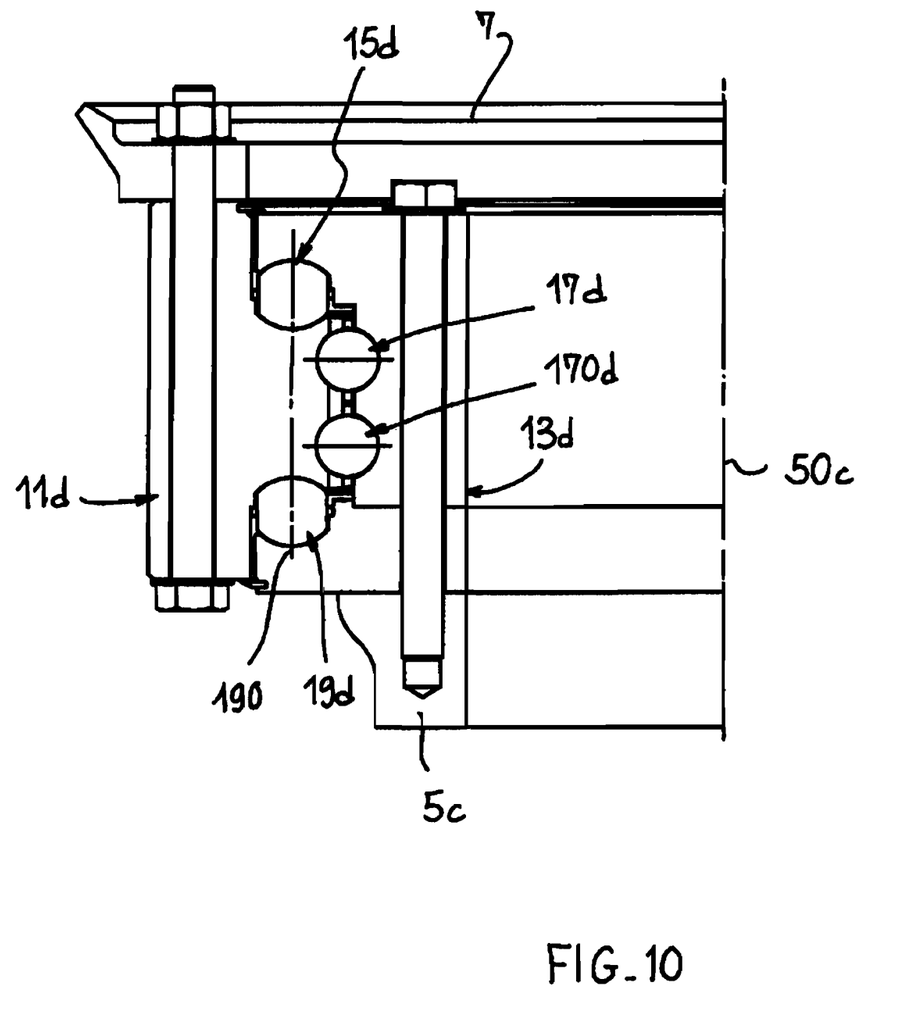

Moreover, FIGS. 9, 10, the mobile members 15d, 19d of the (axial) end rows, although once again at point contact with the adjacent bearing race tracks (here marked as 11d, 13d) as FIGS. 7, 8 are barrel bearings. The rotational axis of each of these barrel bearings is oriented perpendicularly to the bearing rotational axis 50c. The mobile members, respectively 17d and 17d, 170d, of the (axially) intermediary row(s) are balls.

Figure 11:
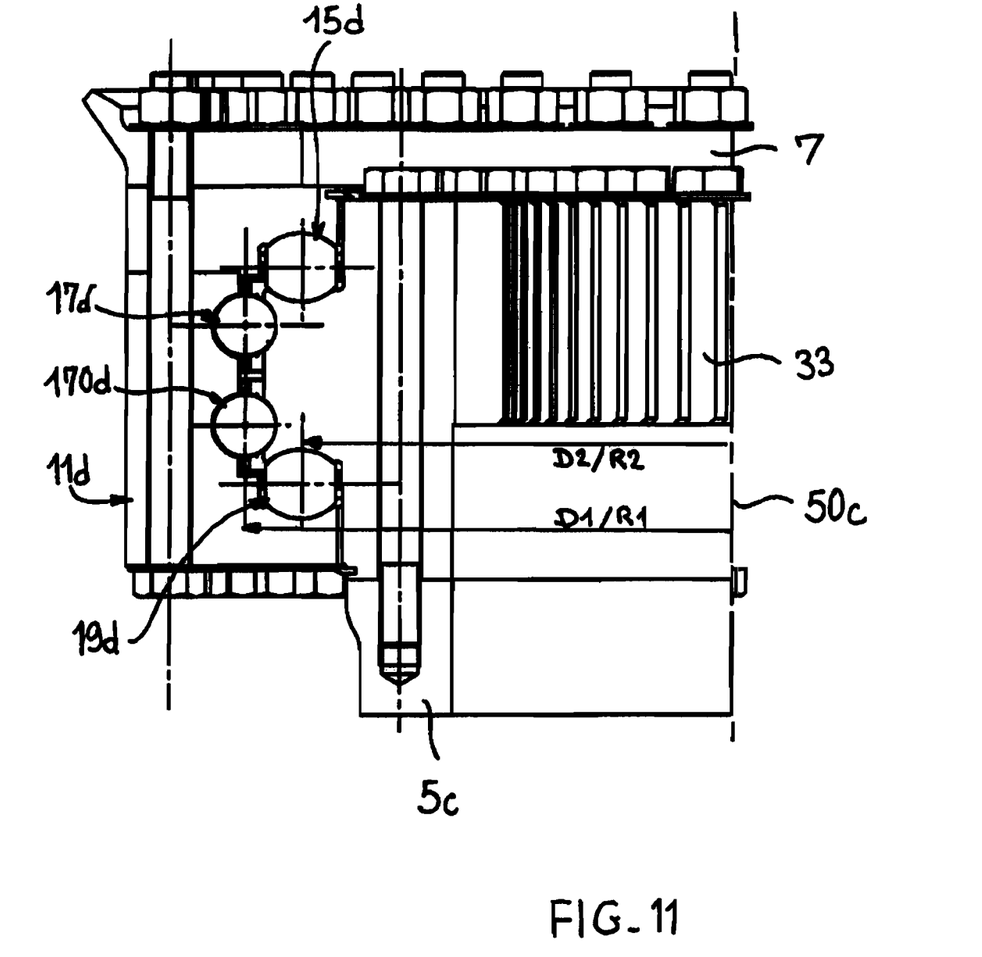

As for FIG. 11, it once again shows that the mobile members of the intermediary row(s) may be radially located in a farther away case, in a less farther away case (FIG. 10), from the axis 50c (D2/R2) than the end mobile member rows are.

Regarding this, it is worth noting that the inner race versions in two portions (FIGS. 6-10) or with outer race in two portions (FIGS. 3, 4, 11) will be useful for the positioning of the drive teeth 33 which will always be achieved on the race in one part. Based on the configurations, the teeth are on the radially internal race or the external race.

Regarding the bearing surfaces of the mobile members with presented point contacts (balls, barrel bearings), the current slewing ring will preferably have (a) row(s) of mobile members with two contact zones "two zone point contact".

As for the use of balls in radial load, it makes it possible to achieve a pre-loaded assembly which will introduce stiffness and limit the radial race movements, thus limiting false brinelling.

The invention claimed is:

1. A bearing having a rotational axis and interposed between a first structure and a second structure, the first and second structures being, each, able to turn around the bearing axis and to turn with respect to each other around the bearing rotational axis, said bearing comprising:
    first and second bearing races a portion of the second bearing race extending around the first bearing race radially to said rotational axis,
    and several series of mobile members interposed between the first and second bearing races, annularly around said rotational axis,
    wherein said several series of mobile members comprise at least three annular series, at least two of said three series are located, with respect to said rotational axis, on different radiuses and are arranged in at least three rows scaled along said rotational axis and wherein the mobile members of an intermediate row of said at least three rows of mobile members scaled along said bearing rotational axis are preloaded in a plane that is perpendicular to said rotational axis.

2. The bearing according to claim 1, wherein said at least three rows of mobile members scaled along said bearing rotational axis comprise:
    two end rows,
    and at least one intermediate row of mobile members able to move along tracks of the first and second bearing races according to point contacts.

3. The bearing according to claim 2, wherein the mobile members of the intermediate row of said at least three rows of mobile members comprise balls.

4. The bearing according to claim 2, wherein the two end rows of said at least three rows of mobile members scaled along said bearing rotational axis each comprise one of a series of roller bearings and a series of barrel bearings, having respectively and individually a rotational axis transverse to the bearing rotational axis.

5. The bearing according to claim 4, wherein the individual rotational axis of the roller bearings or the barrel bearings is perpendicular to the bearing rotational axis.

6. The bearing according to claim 1, wherein said at least three rows of mobile members scaled along said bearing rotational axis comprise:

two end rows each comprising a series of roller bearings individually having a rotational axis transverse to the bearing rotational axis, and at least an intermediate row of mobile members comprising balls.

7. The bearing according to claim 6, wherein the roller bearings are cylinders of constant section.

8. The bearing according to claim 1, wherein said at least three rows of mobile members scaled along said bearing rotational axis comprise:

two end rows each comprising a series of barrel bearings individually having a rotational axis transverse to the bearing rotational axis, and at least an intermediate row of mobile members comprising balls.

9. The bearing according to claim 8, further comprising two intermediate rows of mobile members scaled along said bearing rotational axis.

10. The bearing according to claim 1, wherein the mobile members of the intermediate row are all identical and located in a same median diameter centered on said bearing rotational axis.

11. A wind turbine comprising a bearing according to claim 1, with said first structure comprising a rotor hub and said second structure comprising at least a blade and the blade being able to turn with respect to the hub.

12. A wind turbine comprising a bearing according to claim 1, with said first structure comprising a rotor hub and said second structure comprising at least a blade and the blade being able to turn with respect to the hub.

* * * * *